Patented Jan. 10, 1950

2,493,915

UNITED STATES PATENT OFFICE 2,493,915

PHOSPHORIC ACID

Roy Cross, Kansas City, Mo.; Mary Forbes Cross and First National Bank of Kansas City, executors of said Roy Cross, deceased, assignors to Kansas City Testing Laboratory, Kansas City, Mo., a corporation of Missouri No Drawing. Application January 10, 1946, Serial No. 640,369

2 Claims. (Cl. 23—165)

This invention relates to a process of production of phosphoric acid from phosphate rock.

It is obvious to anyone skilled in the art that an economic method of production of phosphoric acid has much practical value and it is not necessary to point out the importance and value of this invention. Its value is perfectly obvious to any skilled person.

It is of great importance to produce phosphoric acid as such for industrial uses and also to produce phosphoric acid to be used in connection with the manufacture of ammonium phosphate, potassium phosphate and other phosphates. For fertilizer purposes, the ammonium phosphate and potassium phosphate are highly soluble and particularly useful. The cheapest phosphates exist naturally as phosphate rock in such States as Florida, Tennessee, Idaho and Montana.

It is practical to treat phosphate rock with sulphuric acid in order to make the phosphoric acid available in soluble form. Even in the treatment with sulphuric acid, the phosphate as used in fertilizers must be neutralized and is therefore converted back to a relatively insoluble calcium phosphate. After this acid treatment however, the calcium phosphate is in such a finely divided condition that the maximum solubility of calcium phosphate is obtained.

In the present invention, phosphate rock is treated with mineral acid to release the phosphoric acid in as nearly an anhydrous condition as possible and the phosphoric acid is then extracted with a volatile preferably organic solvent. Illustrative of the process is the following: Phosphate rock is treated with a minimum amount of moisture present with sulphuric acid, hydrogen chloride or even hydrogen fluoride or any other strong acid to form phosphoric acid together with the calcium salt of the acid used in treatment. This phosphoric acid is then extracted with sulphuric ether, amyl alcohol or other volatile solvent. Any organic solvent which will dissolve the phosphoric acid but will not dissolve the calcium salt may be used. A very good solvent is sulphuric ether which is also highly volatile. Sulphuric ether is a low boiling organic extracting liquid boiling at 35° C. After extracting the phosphoric acid, the ether is readily evaporated and recovered and is again used for dissolving additional phosphoric acid. The operation may be continuous, semi-continuous or may be entirely batch operation. In the continuous operation for example, hydrogen chloride may be passed upward through a tower containing granular phosphate rock. The ether may be passed downward to extract the phosphoric acid as it is formed. The ether may be evaporated and used repeatedly. Instead of hydrogen chloride, hydrogen fluoride may be used as the extracting acid. In the case of hydrogen fluoride, water may be used as the volatile solvent because of the insolubility of calcium fluoride.

Representative of the reaction of the three different acids preferably used are the following:

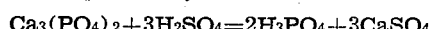

$$Ca_3(PO_4)_2 + 3H_2SO_4 = 2H_3PO_4 + 3CaSO_4$$

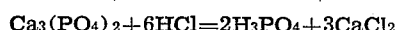

$$Ca_3(PO_4)_2 + 6HCl = 2H_3PO_4 + 3CaCl_2$$

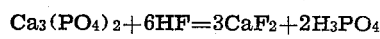

$$Ca_3(PO_4)_2 + 6HF = 3CaF_2 + 2H_3PO_4$$

The term calcium phosphate as used in this specification refers to any natural phosphate rock as well as any form of mineral phosphate.

I claim:

1. The method of making phosphoric acid from calcium phosphate material which comprises reacting the calcium phosphate material in a tower by introducing into the tower and passing upwardly through the calcium phosphate material therein a gaseous reagent selected from the group consisting of hydrogen chloride and hydrogen fluoride under conditions in which a minimum amount of moisture is present so as to release the phosphoric acid in as nearly an anhydrous condition as possible and to form a halogen salt of calcium, introducing into the tower and passing downwardly through the calcium phosphate material and countercurrent to the reagent and contemporaneously therewith a volatile organic solvent which selectively dissolves the phosphoric acid in situ from the halogen calcium salt as it is formed, and recovering the phosphoric acid from the organic solvent.

2. The method set forth in claim 1 in which the volatile organic solvent is sulphuric ether, separating the solvent from the phosphoric acid by evaporation, and returning the separated solvent to the tower for repeated operation.

ROY CROSS.

REFERENCES CITED

The following references are of record in the file of this patent:

UNITED STATES PATENTS

| Number | Name | Date |
|---|---|---|
| 1,018,746 | Dittmar | Feb. 27, 1912 |
| 1,313,379 | Hechenbleikner | Aug. 19, 1919 |
| 1,929,442 | Milligan | Oct. 10, 1933 |
| 1,969,951 | Seyfried | Aug. 14, 1934 |
| 1,981,145 | Keller | Nov. 20, 1934 |
| 2,152,364 | Seyfried | Mar. 28, 1939 |

FOREIGN PATENTS

| Number | Country | Date |
|---|---|---|
| 464,370 | Great Britain | Apr. 16, 1937 |

OTHER REFERENCES

Fox: Alcohol in the Manufacture of Phosphoric Acid and Phosphates, Journal of Industrial & Engineering Chemistry, vol. 6, No. 10, (1914); pages 828–829.